(12) United States Patent
Ono et al.

(10) Patent No.: US 7,032,696 B2
(45) Date of Patent: Apr. 25, 2006

(54) ELECTRIC VEHICLE

(75) Inventors: Tomohiro Ono, Shizuoka (JP); Junji Terada, Shizuoka (JP); Atsushi Kurosawa, Shizuoka (JP); Koushi Sasaki, Shizuoka (JP); Hiroaki Yagi, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 205 days.

(21) Appl. No.: 10/683,813

(22) Filed: Oct. 9, 2003

(65) Prior Publication Data

US 2004/0073344 A1  Apr. 15, 2004

(30) Foreign Application Priority Data

Oct. 15, 2002  (JP) .............................. 2002-301060

(51) Int. Cl.
 *B60K 1/00* (2006.01)
(52) U.S. Cl. ...................... 180/65.1; 180/220; 701/22
(58) Field of Classification Search ................ 180/220, 180/65.1, 701; 701/22; 318/139
See application file for complete search history.

(56) References Cited

U.S. PATENT DOCUMENTS

| | | | | | |
|---|---|---|---|---|---|
| 3,843,912 | A | * | 10/1974 | Anderson | 318/258 |
| 3,911,343 | A | * | 10/1975 | Oster | 388/847 |
| 4,090,115 | A | * | 5/1978 | Franz, Jr. | 388/811 |
| 4,123,693 | A | * | 10/1978 | Anderson et al. | 318/376 |
| 4,217,527 | A | * | 8/1980 | Bourke et al. | 318/139 |
| 4,549,119 | A | * | 10/1985 | Slagle | 318/111 |
| 2003/0205977 | A1 | * | 11/2003 | Itabashi et al. | 318/434 |
| 2004/0222757 | A1 | * | 11/2004 | Inui et al. | 318/146 |

FOREIGN PATENT DOCUMENTS

JP  07-336807  12/1995

* cited by examiner

*Primary Examiner*—Christopher Ellis
*Assistant Examiner*—Brian Swenson
(74) *Attorney, Agent, or Firm*—Hogan & Hartson, L.L.P.

(57) ABSTRACT

A method for carrying out a boosting operation includes detecting that a boosting operation has been carried out for making a current value of an electric motor larger than a normal full open throttle value, detecting that an electric motor has not rotated, detecting that a predetermined time period has elapsed since the detection that the electric motor has not rotated; and after the detection that the predetermined time period has elapsed, controlling the current value of the electric motor to be equal to or smaller than a limit value that is smaller than the normal full open throttle value.

16 Claims, 3 Drawing Sheets

ELECTRIC VEHICLE

BACKGROUND OF THE INVENTION

1. Field of the Invention

The present invention relates to an electric vehicle capable of carrying out a boosting operation for making a current value of an electric motor larger than that in a normal full throttle time.

2. Description of Related Art

Conventionally, there exists control technology in a stalled state of a motor of an electric car.

The conventional electric motor, however, does not carry out a boosting operation for making a motor current larger than that in a normal time for rapid acceleration.

According to the invention, it is an advantage to provide an electric vehicle capable of carrying out a control operation in boosting and stalled states of a motor of the electric vehicle.

SUMMARY OF THE INVENTION

In order to resolve the above-described conventional problem, there is provided an electric vehicle including an electric motor for driving a wheel and capable of carrying out a boosting operation for making a current value of the electric motor larger than a normal full open throttle value. According to the present invention, a method includes detecting that the boosting is carried out and detecting that the electric motor is not rotated, detecting that a predetermined time period has elapsed since the detection that the electric motor has not rotated, and after the detection that the predetermined time period has elapsed, controlling the current value of the electric motor to be equal to or smaller than a limit value that is smaller than the normal full open throttle value.

DETAILED DESCRIPTION OF THE PREFERRED EMBODIMENTS

A mode for carrying out the invention will be explained with reference to the drawings as follows.

Figure 1:
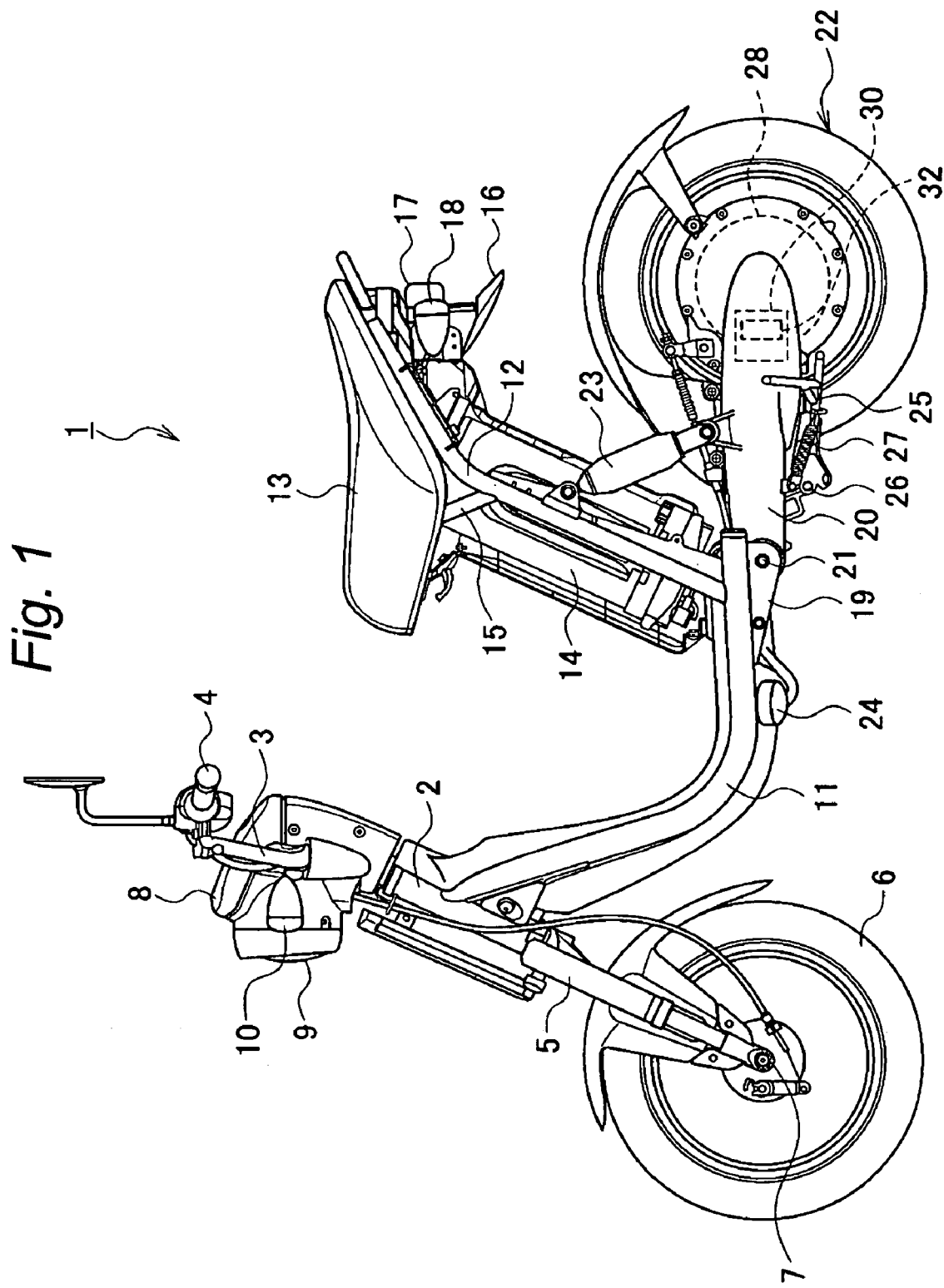
FIG. 1 is a side view of an electric motor cycle to which the invention is applied.

FIG. 1 is a side view of an electric motor cycle to which the invention is applied.

An electric motor cycle 1 shown in FIG. 1 is provided with a head pipe 2 at an upper front portion of a vehicle body thereof and a steering shaft, not illustrated, is pivotably inserted into the head pipe 2. Further, a handle 3 is attached to an upper end of the steering shaft. Both ends of the handle 3 are attached with grips 4 and the grip 4 on the right side (depth side of FIG. 1), not illustrated, constitutes a pivotable throttle grip (hereinafter, described as a throttle.

A lower portion of the head pipe is attached with upper portions of a pair of left and right front forks 5, and a front wheel 6 is rotatably supported axially by a front wheel axle 7 at lower ends of the respective front forks 5. Further, a meter 8 is arranged above a center of the handle 3, a head lamp 9 is arranged on a lower side of the meter 8 and flasher lamps 10 (only one of them is illustrated in FIG. 1) are respectively provided on both sides thereof.

A pair of left and right vehicle body frames 11 are extended toward a rear side of the vehicle body. That is, the vehicle body frame 11 is constituted by a shape of a round pipe, extended from the head pipe 2 to the rear side of the vehicle body in a skewed lower direction and thereafter, bent in a circular arc shape to the rear side and extended substantially horizontally to the rear side of the vehicle body. A pair of left and right vehicle body frames 12 are extended from rear end portions of the respective vehicle body frames 11 in a skewed upper direction and connected to each other on a rear side of a seat 13. A battery 14 is arranged between the pair of left and right vehicle body frames 12.

Meanwhile, a seat stay (not illustrated) of an inverse U-shape is connected to the left and right vehicle body frames 12 and supported by a pair of left and right stays 15 (only one of them is illustrated). The seat 13 is arranged at the seat stay for opening and closing.

Further, a tail lamp 17 is attached to a rear face of a rear fender 16 attached to rear ends of the vehicle body frames 12 and flasher lamps 18 (only one of them is illustrated) are arranged on left and right thereof.

Meanwhile, a pair of left and right rear arm brackets 19 (only one of them is illustrated) are respectively welded to the rear end portions of the left and right vehicle body frames 11, and front ends of rear arms 20 are supported by the rear arm brackets 19 (pivotably) by a pivot shaft 21. Further, a rear wheel 22 which is a drive wheel is rotatably supported axially by rear ends of the rear arms 20 and the rear arms 20 and the rear wheel 22 are suspended from the vehicle body frames 12 by rear cushions 23.

Further, foot steps 24 (only one of them is illustrated) are respectively attached to lower sides of the left and right vehicle body frames 11, lower portions of the rear arms 20 are pivotably provided with side stands 25 axially by a shaft 26 and the side stands 25 are urged in a closing direction by a return spring 27.

An electric motor 28 of a thin axial gap type which is flat in a vehicle width direction is contained at substantially circular portions of rear ends of the rear arms 20. Further, contiguous to the electric motor 28, an electric motor control unit 30 for controlling the electric motor 28 and an encoder 32 for detecting a rotational position of a rotor of the electric motor 28 are contained.

Figure 2:
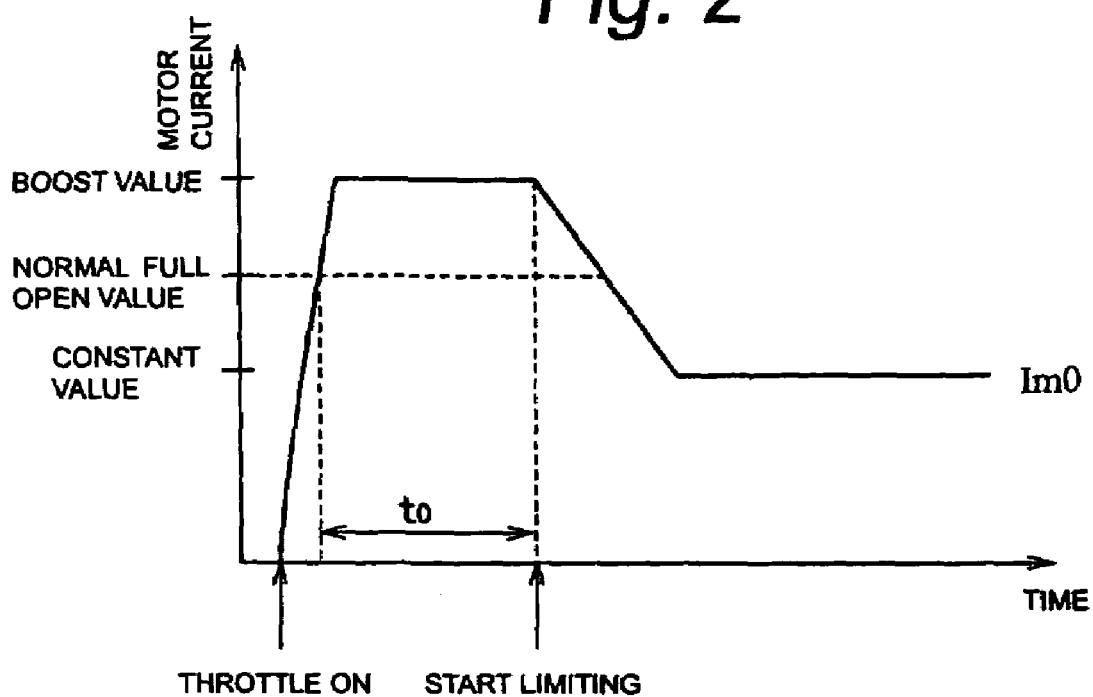
FIG. 2 is a diagram showing a time-motor current characteristic of an electric motor cycle 1.
Figure 3:
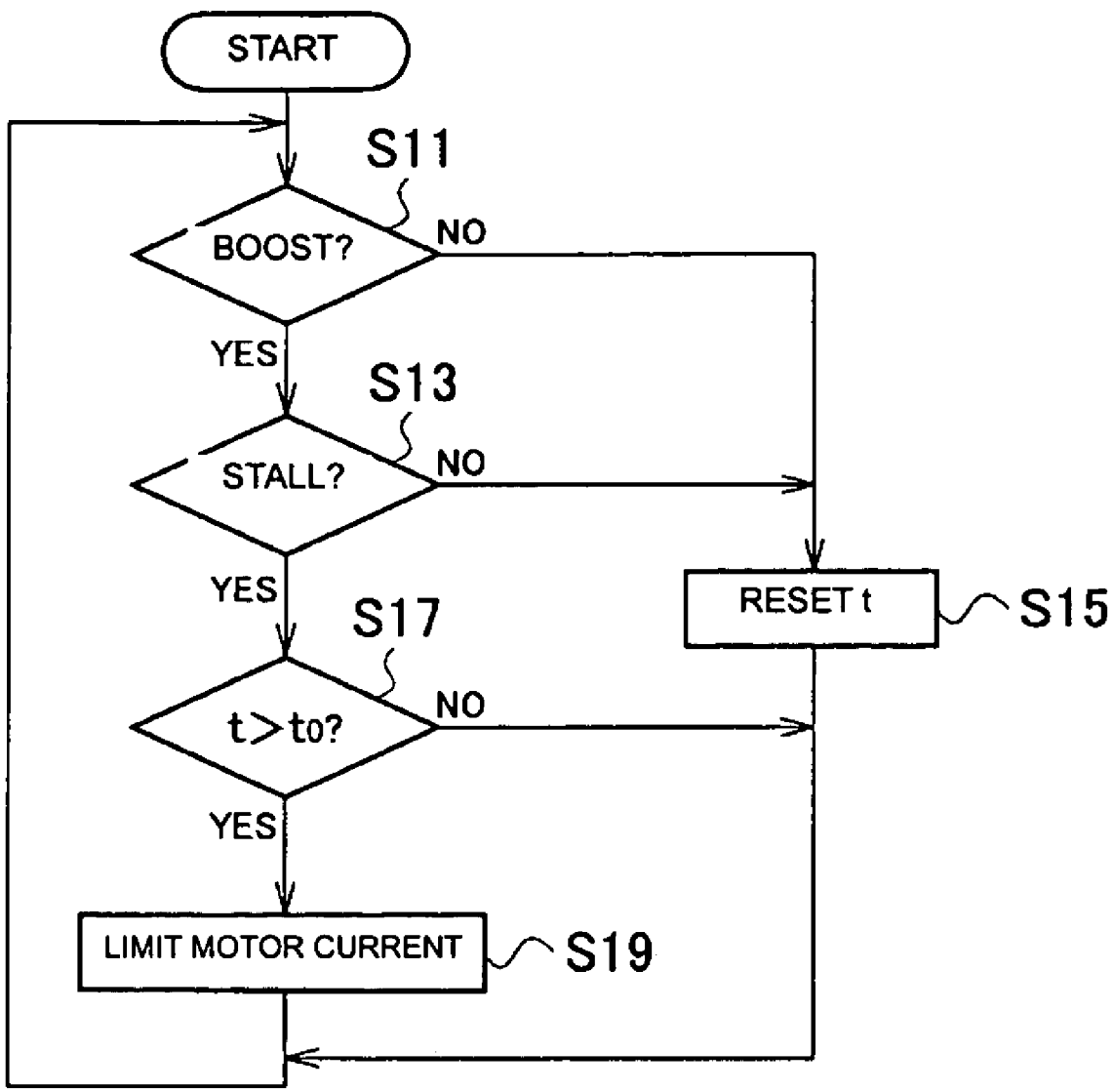
FIG. 3 is a flowchart of a control of the electric motor cycle 1.

FIG. 2 is a diagram showing a time-motor current characteristic of the electric motor cycle 1. FIG. 3 is a flowchart of a control operation of the electric motor cycle 1.

According to the electric motor cycle 1, when a throttle is fully opened, for example, from when the electric motor cycle 1 is stationary, current of the electric motor 28 increases to accelerate. However, when the throttle remains fully opened, the motor current increases until reaching a boost value if the motor current is equal to or higher than a normal value (normal full open value) and the vehicle speed is below a predetermined value. Therefore, the electric motor cycle 1 accelerates more than normal. Further, when the vehicle speed goes beyond the predetermined value, the motor current returns to the normal value while the throttle is kept fully open so that power consumption by wasteful acceleration can be prevented.

The electric motor cycle 1 enabling to carry out boosting in this way constantly executes the control operation of FIG. 3. Further, the electric motor cycle 1 includes a timer which increases its count with an elapsed time period (hereinafter, timer) and has a threshold t0 (>0 second) of the elapsed time period and a limit value Im0 (<normal full open value) of the motor current set.

First, whether the motor current is with in a boosting region (step S11) is determined. When the determination is NO, the value t of the timer is reset (step S15) and the process returns to step S11. Meanwhile, when the determination is YES, whether or not a stalled state exist (a state in which the motor does not rotate although the motor current flows) or not (step S13) is determined. When the determination is NO, the value t of the timer is reset (step S15) and the process returns to step S11.

Further, the state in which the motor has not rotated, means that the revolution of the motor is equal to or smaller than the lowest value and does not strictly mean that the motor has not rotated.

When the determination is YES at steps S11 and S13, the operation determines whether the value t of the timer is equal to or larger than the threshold to (step S17). When the determination is NO (less than t0), the operation returns to step S11. When the determination is YES at steps S11, S13 and S17, control is executed to make the motor current equal to or lower than a limit value Im0 (step S19).

As has been explained above, according to the electric motor cycle 1, there is provided an electric vehicle capable of carrying out a control operation in the boosting and stalled states. Further, a fast response which cannot be achieved by detecting temperature of the electric motor 28 or an inverter for driving the electric motor 28 is achieved.

According to the invention, an electric vehicle is capable of controlling the boosting and stalled states of a motor of the electric vehicle, by detecting that there is a boosting state and detecting that the electric motor has not rotated. According to the invention when a predetermined time period has elapsed since the detection that the electric motor has not rotated, the current value of the electric motor is controlled to be equal to or smaller than a limit value that is smaller than the normal full open throttle value.

What is claimed is:

1. A method for carrying out a boosting operation comprising:
   detecting that a boosting operation has been carried out for making a current value of an electric motor larger than a normal full open throttle value;
   detecting that an electric motor has not rotated;
   detecting that a predetermined time period has elapsed since the detection that the electric motor has not rotated; and
   after the detection that the predetermined time period has elapsed, controlling the current value of the electric motor to be equal to or smaller than a limit value that is smaller than the normal full open throttle value.

2. The method according to claim 1, further comprising determining whether the motor current is within a boosting operation region.

3. The method according to claim 2, further comprising resetting a timer if the motor current is not within the boosting operation region.

4. The method according to claim 3, further comprising determining whether a stalled state exists.

5. The method according to claim 4, wherein the stalled state is a state which the motor does not rotate although there is current flow.

6. The method according to claim 2, further comprising resetting a timer.

7. The method according to claim 6, further comprising determining whether a value of the timer is equal to or larger than a threshold value.

8. The method according to claim 7, further comprising making the motor current equal to or lower than the limit value when the value of the timer is equal to or larger than the threshold value.

9. The method according to claim 8, further comprising increasing the motor current until a boost value is reached if the motor current is equal to or higher than the normal full open throttle value and a vehicle speed is below a predetermined value.

10. An electric motor comprising:
    an electric motor control unit that detects that a boosting operation has been carried out for making a current value of an electric motor larger than a normal full open throttle value;
    an encoder that detects that the electric motor has not rotated; and
    a timer that detects that a predetermined time period has elapsed since the encoder detected that the electric motor has not rotated;
    wherein after the detection that the predetermined time period has elapsed, the encoder controls the current value of the electric motor to be equal to or smaller than a limit value that is smaller than the normal full open throttle value.

11. The electric motor according to claim 10, wherein the electric motor drives a wheel.

12. The electric motor according to claim 10, wherein the motor is contained at rear arms of a vehicle.

13. The electric motor according to claim 10, wherein the encoder detects a rotational position.

14. An electric motor comprising:
    means for detecting that a boosting operation has been carried out for making a current value of an electric motor larger than a normal full open throttle value;
    an encoder that detects that the electric motor has not rotated; and
    a timer that detects that a predetermined the period has elapsed since the encoder detected that the electric motor has not rotated;
    wherein after the detection that the predetermined time period has elapsed, the encoder controls the current value of the electric motor to be equal to or smaller than a limit value that is smaller than the normal full open throttle value.

15. The electric motor according to claim 14, wherein the electric motor drives a wheel.

16. The electric motor according to claim 14, wherein the motor is contained at rear arms of a vehicle.

* * * * *